United States Patent
Herzog et al.

(10) Patent No.: US 11,571,856 B2
(45) Date of Patent: Feb. 7, 2023

(54) DEVICE FOR PRODUCING THREE-DIMENSIONAL OBJECTS BY SUCCESSIVELY SOLIDIFYING LAYERS AND AN ASSOCIATED METHOD AND EVASIVE RETURN MOVEMENT WITH COATING DEVICE

(71) Applicant: CL SCHUTZRECHTSVERWALTUNGS GMBH, Lichtenfels (DE)

(72) Inventors: Frank Herzog, Lichtenfels (DE); Florian Bechmann, Lichtenfels (DE); Fabian Zeulner, Lichtenfels (DE); Markus Lippert, Lichtenfels (DE); Jens Stammberger, Rödental (DE); Christian Diller, Lichtenfels (DE)

(73) Assignee: CONCEPT LASER GMBH, Lichtenfels (DE)

( * ) Notice: Subject to any disclaimer, the term of this patent is extended or adjusted under 35 U.S.C. 154(b) by 942 days.

(21) Appl. No.: 15/568,335

(22) PCT Filed: Mar. 31, 2016

(86) PCT No.: PCT/EP2016/057093
§ 371 (c)(1),
(2) Date: Oct. 20, 2017

(87) PCT Pub. No.: WO2016/177516
PCT Pub. Date: Nov. 10, 2016

(65) Prior Publication Data
US 2018/0079137 A1    Mar. 22, 2018

(30) Foreign Application Priority Data
May 7, 2015   (DE) .................... 10 2015 107 178.9

(51) Int. Cl.
*B29C 64/35* (2017.01)
*B29C 64/214* (2017.01)
(Continued)

(52) U.S. Cl.
CPC ............ *B29C 64/35* (2017.08); *B29C 64/214* (2017.08); *B29C 64/236* (2017.08);
(Continued)

(58) Field of Classification Search
CPC ....... B29C 64/35; B29C 64/214; B29C 64/20; B22F 2003/1056; B22F 3/1055;
(Continued)

(56) References Cited

U.S. PATENT DOCUMENTS 5,238,614 A * 8/1993 Uchinono ............. B29C 64/135
264/401
5,358,673 A * 10/1994 Heller ..................... B29C 41/36
156/273.5
(Continued)

FOREIGN PATENT DOCUMENTS

CN    102688829 A    9/2012
CN    105163930 A    12/2015
(Continued)

OTHER PUBLICATIONS

China's First Office Action CN2016800090819 dated Dec. 3, 2018.
(Continued)

*Primary Examiner* — Abbas Rashid
*Assistant Examiner* — Elisa H Vera
(74) *Attorney, Agent, or Firm* — Dority & Manning, P.A.

(57) ABSTRACT

A device for producing three-dimensional objects by successively solidifying layers of a construction material that can be solidified using radiation on the positions corresponding to the respective cross-section of the object, with a housing comprising a process chamber, a construction con-
(Continued)

tainer situated therein, an irradiation device for irradiating layers of the construction material on the positions corresponding to the respective cross-section of the object, an application device for applying the layers of the construction material onto a carrying device within the construction container or a previously formed layer, a metering device for delivering the construction material, wherein the application device comprises a coating element which distributes the construction material delivered by the metering device as a thin layer in an application area along a linear application movement, wherein at the end of a coating process for a layer when returning the coating element 11 to a coating starting position.

20 Claims, 7 Drawing Sheets

(51) Int. Cl.
  *B29C 64/236* (2017.01)
  *B29C 64/343* (2017.01)
  *B33Y 10/00* (2015.01)
  *B33Y 30/00* (2015.01)
(52) U.S. Cl.
  CPC ............ *B29C 64/343* (2017.08); *B33Y 10/00* (2014.12); *B33Y 30/00* (2014.12)
(58) Field of Classification Search
  CPC ....... B33Y 30/00; B33Y 10/00; Y02P 10/295; C23C 24/08
  See application file for complete search history.

(56) References Cited

U.S. PATENT DOCUMENTS

| | | | |
|---|---|---|---|
| 7,454,262 | B2 | 11/2008 | Larsson |
| 8,105,527 | B2 | 1/2012 | Wahlstrom |
| 9,676,143 | B2 | 6/2017 | Kashani-Shirazi |
| 10,220,565 | B2 | 3/2019 | El-Siblani |
| 10,548,695 | B2 | 2/2020 | Ucklemann et al. |
| 10,807,308 | B2 | 10/2020 | Pialot et al. |
| 2005/0263934 | A1 | 12/2005 | Chung et al. |
| 2006/0165546 | A1 | 7/2006 | Yamada et al. |
| 2007/0075461 | A1 | 4/2007 | Hunter et al. |
| 2009/0286007 | A1* | 11/2009 | Brancher ............ B22F 3/1055 427/554 |
| 2013/0004607 | A1 | 1/2013 | Hoechsmann et al. |
| 2014/0265045 | A1* | 9/2014 | Cullen ................. B29C 64/35 264/497 |
| 2016/0121397 | A1* | 5/2016 | Aydin .................. B22F 1/0003 118/708 |
| 2016/0136731 | A1* | 5/2016 | McMurtry ........... B29C 64/153 419/53 |
| 2016/0361872 | A1* | 12/2016 | El-Siblani ............ B33Y 70/00 |

FOREIGN PATENT DOCUMENTS

| | | |
|---|---|---|
| CN | 105408040 A | 3/2016 |
| CN | 105579218 A | 5/2016 |
| DE | 19805726 A1 | 9/1999 |
| DE | 102007040755 A | 3/2009 |
| DE | 102007040755 A1 | 3/2009 |
| DE | 102009035258 A1 | 2/2011 |
| DE | 102009056696 B4 | 11/2011 |
| DE | 202009018948 U1 | 10/2014 |
| DE | 202009018948 U1 | 10/2014 |
| EP | 1600282 B1 | 11/2005 |
| EP | 28732889 A2 | 5/2014 |
| JP | 2006/200030 A | 8/2006 |
| JP | 2012/246541 A | 12/2012 |
| WO | 2014191200 A1 | 12/2014 |
| WO | WO-2014199150 A1 * | 12/2014 ........... B29C 64/153 |

OTHER PUBLICATIONS

International Search Report Corresponding to Application No. PCT/EP2016/057093 dated Sep. 15, 2016.
German Search Report Corresponding to Application No. 102015107178 dated Aug. 8, 2018.

* cited by examiner

DEVICE FOR PRODUCING THREE-DIMENSIONAL OBJECTS BY SUCCESSIVELY SOLIDIFYING LAYERS AND AN ASSOCIATED METHOD AND EVASIVE RETURN MOVEMENT WITH COATING DEVICE

CROSS-REFERENCE TO RELATED APPLICATIONS

This application is a United States national stage entry of an International Application serial no. PCT/EP2016/057093 filed Mar. 31, 2016 which claims priority to German Patent Application serial no. 10 2015 107 178.9 filed May 7, 2015. The contents of these applications are incorporated herein by reference in their entirety as if set forth verbatim.

The invention relates to a device for producing three-dimensional objects by successively solidifying layers of a construction material that can be solidified using radiation on the positions corresponding to the respective cross-section of the object, comprising the other features of the preamble of claim 1 and an associated method.

A device of the type described above first has a housing in which a process chamber is situated. Below the level of a process chamber floor, a construction container is situated, on which construction material and a sub-object or object rest during the manufacturing process. Moreover, an application device is provided with which layers of the construction material are applied onto the carrying device of the construction container or a previously formed layer. A metering device serves to deliver construction material to the coating element of the application device. The coating element runs especially linearly across the surface of the construction field defined by the construction container and distributes the construction material as a very thin layer, which is then melted by irradiation with a focused laser beam and solidifies after cooling to form the object. Such a device is known from DE 10 2006 056 422.7, for example.

The known devices are disadvantageous insofar as the exposure pause required due to the coating process takes a relatively long time period.

The invention is based on the object to form a device and an associated method such that the entire construction process can be shortened. This object is solved by the coating element making an evasive movement at the end of a coating process for a layer when returning the coating element to a coating starting position, in which the coating element does not cross the scanner beam spatial area between the irradiation device and an applied layer.

As the core of the invention it is thus considered that actions are taken to perform or start immediate exposure preferably across the entire exposure area immediately after the end of a coating process. Basically, the exposure process can already be started directly behind the coating element running in the coating direction during a coating process, but since exposure processes are usually performed distributed over the construction area or large sections of the construction area by way of what is known as "island coating", i.e., small sections are exposed that are partly far apart from each other, to prevent thermal stresses in a construction component layer, it is useful to return the coater such that preferably the entire construction field is freely available for exposure. In other words, the teaching of patent claim 1 comprises all return types in which the coating element or further elements of the application device is/are guided such that a laser beam has free access to the construction area without hindrance by a coating element or any other element of the application device crossing the beam.

The evasive movement advantageously comprises a change of the spatial position of the coater referred to the spatial position of the coater during the coating process. For example, if the coater or coating element is positioned horizontally above the surface to be coated, folding up, swiveling out, turning out from the construction field and the like involves a change of the spatial position, which has a favorable effect on the acceleration of the entire construction process. During the coating element return process, targeted and complete exposure of the entire construction field can be started with one or several scanner(s).

It is also possible to drive the coating element out of the construction field by way of a linear lateral evasive movement and return it laterally of the construction field. It is then possible to keep a plane position of the coating element; there is just relatively much space required for the return movement laterally of the construction field. The linear shift movement can advantageously be arranged rectangularly extended to the application direction, but also transversely.

In addition to the evasive movement, it is advantageous for the acceleration of the construction process if, during the evasive movement, the coating element is moved with increased speed compared to a layer application speed. This shortens the return process of the coating element. If, additionally, the exposure device works, for example, with several scanners above the construction field, the exposure phases and coating phases are shortened.

The coating element can be supported pivotably by at least one axis on one side. Pivoting can be performed horizontally or comprise a swing-up movement. It is also possible, at the end of an application process, to pivot the coating element so to speak rotatingly beyond the construction area in the direction of the application movement and/or pivot it rotatingly around the construction field back to the starting position, so that, during one application process together with the return process, the coating element is pivoted by 360° like a hand on a clock face.

Generally, to return the coating element to the coating starting position, it is also possible to lift it off the layer of the construction plane at the end of the coating process and return it to the coating starting position above a scanner assembly of the exposure device. The return movement can first comprise a vertical movement, then a horizontal movement across the scanner assembly in the direction of the coating starting position, and then a lowering movement directed downwards. It is also possible, however, to return the coater to the starting position by keeping a parallel position to its longitudinal coating direction or by adding pivoting movements of the coating element on a curved line across the scanner assembly.

It will be especially advantageous if the coater making the evasive movement passes a coater changer and there an old coater blade is removed and a new coater blade is slid on. This can be done fully automatically. Coater blades and brushes of different types can be used, depending on the requirements of the construction process. According to the invention, it is also possible to couple a sensor element to a carrier of the coating device instead of a coater or in addition to a coating element and, for example, perform measurements above the construction field such as temperature measurements, a beam caustic measurement, layer surface quality measurements, and the like.

The invention is explained in more detail by means of exemplary embodiments. In which.

Figure 1:
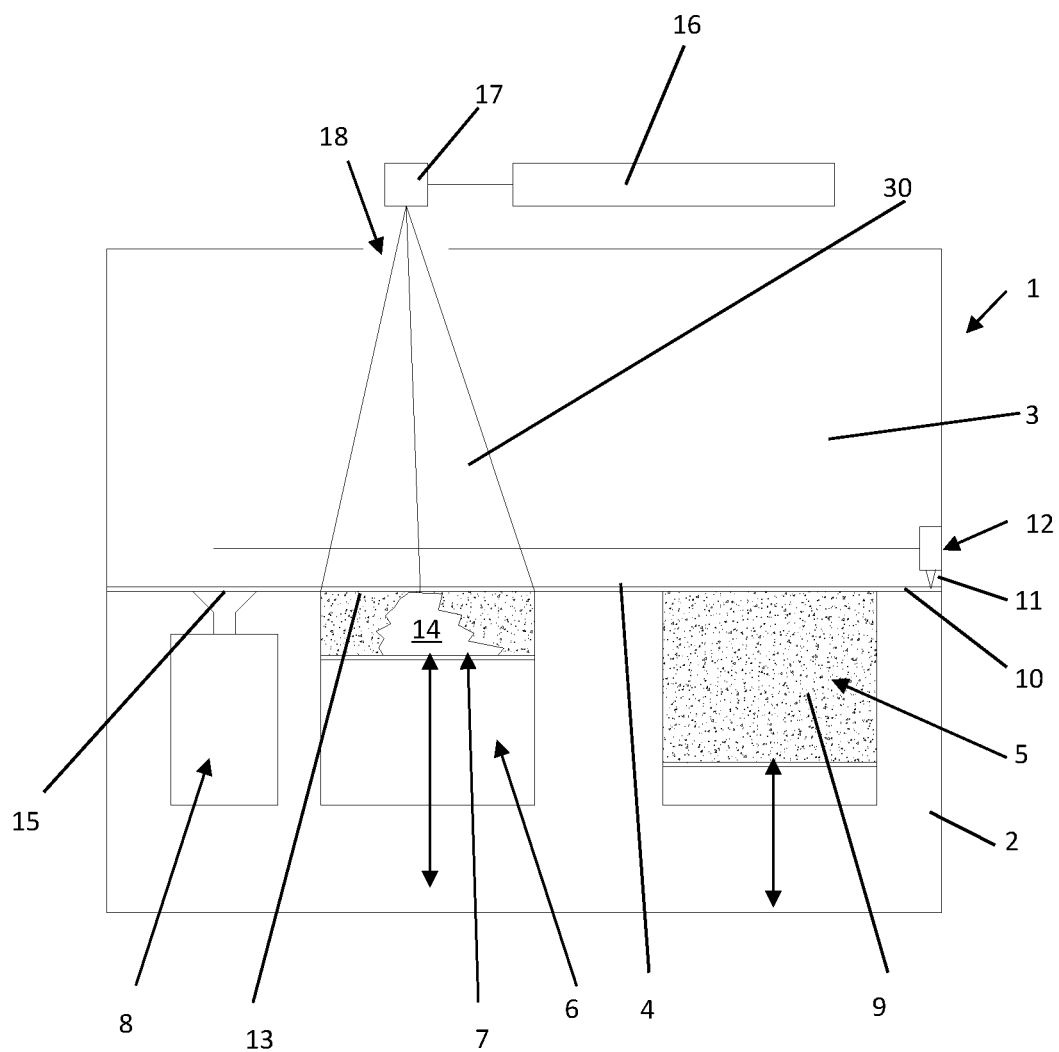
FIG. 1 shows a schematic diagram of a device for producing three-dimensional objects, in which the scanner beam spatial area between the scanner and the construction field is indicated.

At first, reference is made to FIG. 1 to generally present the device according to the invention.

It shows a schematic diagram of a device 1 for producing three-dimensional objects 14 by successively solidifying layers of a construction material 9 that can be solidified using radiation on the positions corresponding to the respective cross-section of the object. The device 1 comprises a housing 2, which encloses a process chamber 3 with a process chamber floor 4. Below the level of the process chamber floor 4, a metering device 5 for delivering construction material 9 and a construction container 6 with a height-adjustable carrying device 7 are arranged. Adjacent to the construction container 6, an overflow container 8 is arranged below the level of the process chamber floor 4. The metering device 5, the construction container 6, and the overflow container 8 are open to the top, i.e., the process chamber floor 4 has openings above the metering device 5, construction container 6, and overflow container 8.

The opening of the construction container 6 is depicted with the reference number 13, the overflow opening of the overflow container 8 has the reference number 15. A coating element 11 of an application device 12 distributes the construction material 9 layer by layer on the construction area.

To solidify the construction material 9 applied on the carrying device 7 or an already solidified layer of the object 14, an irradiation device is provided, which comprises a laser 16 and a scanner 17. In the shown exemplary embodiment, the irradiation device is arranged above the process chamber 3; the laser beam 19 coming from the scanner 17 penetrates a window 18 in process chamber ceiling.

Above the opening 13 of the construction container 6, which so to speak defines the construction area, the scanner beam spatial area 30 is indicated between the scanner 17 and the opening 13; that is the spatial area occupied by a laser beam 19 at maximum deflection up to the edges of the opening 13. In the exemplary embodiment shown in FIG. 1, only one scanner 17 is provided, i.e., the scanner beam spatial area 30 has the form of a pointed pyramid. However, if several scanners 17 are provided, the scanner beam spatial area 30 can also have a different form, e.g., the form of a truncated pyramid.

In the following, reference is made to FIG. 2. It shows the top view of a process chamber floor 4, in which a carriage of a conventional application device 12 is guided on guide rails 10 on both sides, i.e., the forward and backward movement during the coating process or a return process is always performed on the same line. The coating element 11 and the carriage therefore compulsorily cross the scanner beam spatial area 30 lying above the construction container 6 when returning the coating element 11 to a coating starting position.

Figure 2:
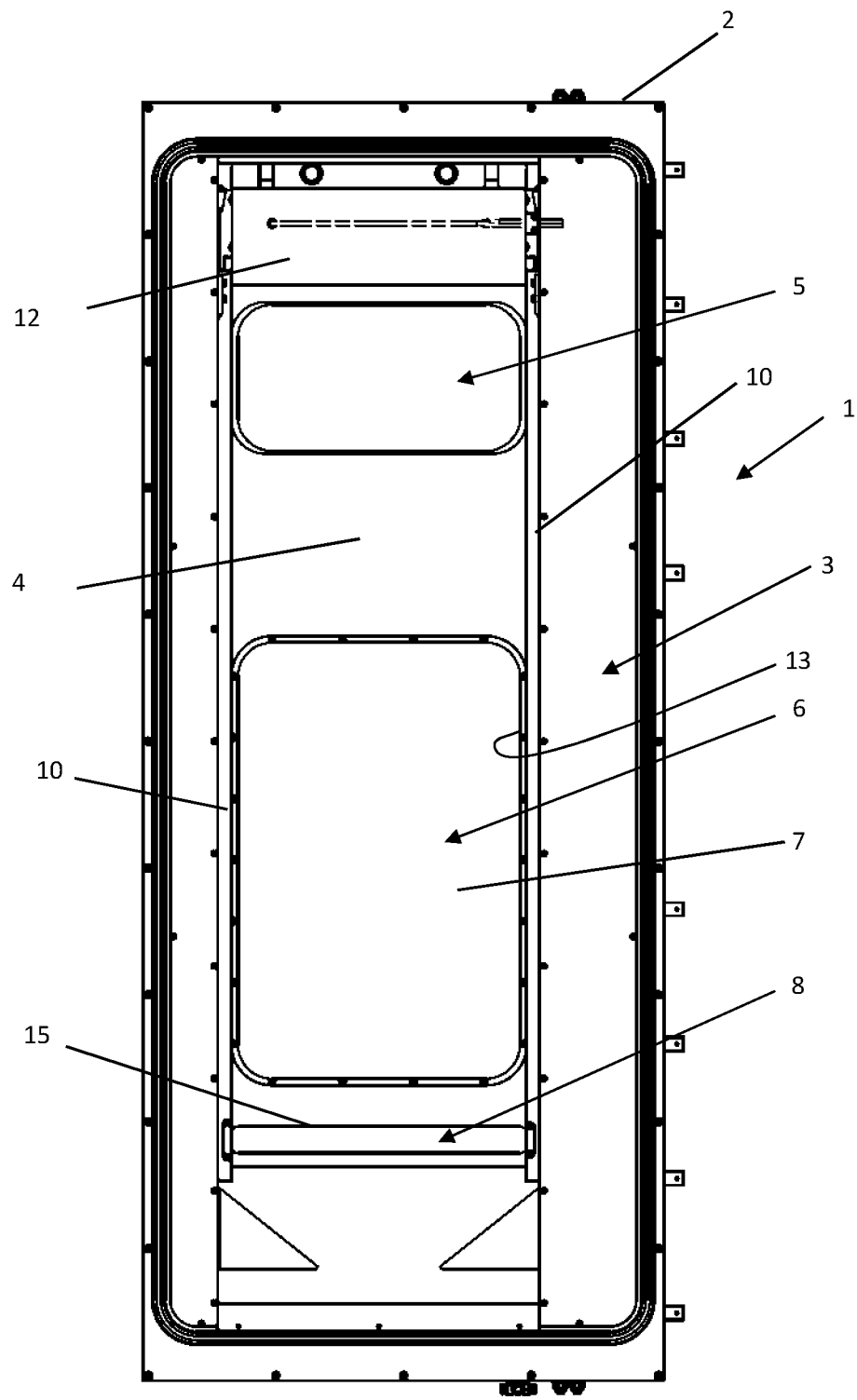
FIG. 2 shows a top view of a process chamber floor with a construction field, metering chamber opening, and overflow opening; (state of the art)
Figure 3:
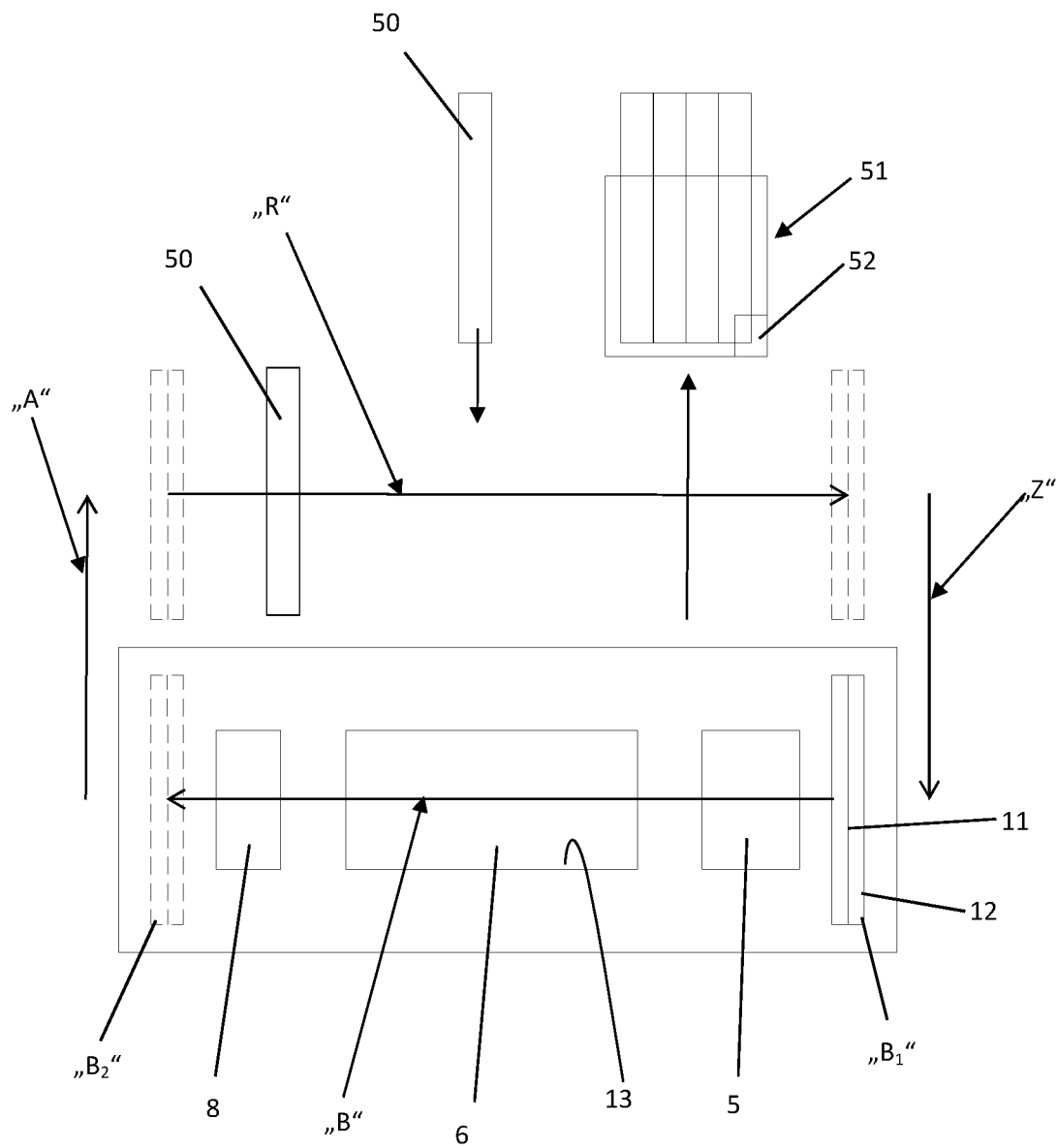
FIG. 3 shows a schematic diagram of coating element movements when a layer is applied with an evasive movement according to the invention.

Similar to FIG. 2, FIG. 3 again shows the process chamber floor 4 with the openings of the metering device 5, construction container 6, and overflow container 8. The application device 12 with the coating element 11 arranged below is guided across the process chamber floor 4 in the direction of the arrow. However, the guiding is performed such that, due to an evasive movement of the entire coating assembly 12, the scanner beam spatial area 30, which lies above the construction chamber 6, remains free. In FIG. 3 it is indicated that the application device 12, after completion of the coating process B, performs an evasive movement A, followed by the reverse movement R, and then another movement Z to return the application device 12 and the coating element 11 to the starting position. The movements coating=B, evasive movement=A, reverse movement=R, and return to starting position=Z are shown again in FIG. 4.

Figure 4:
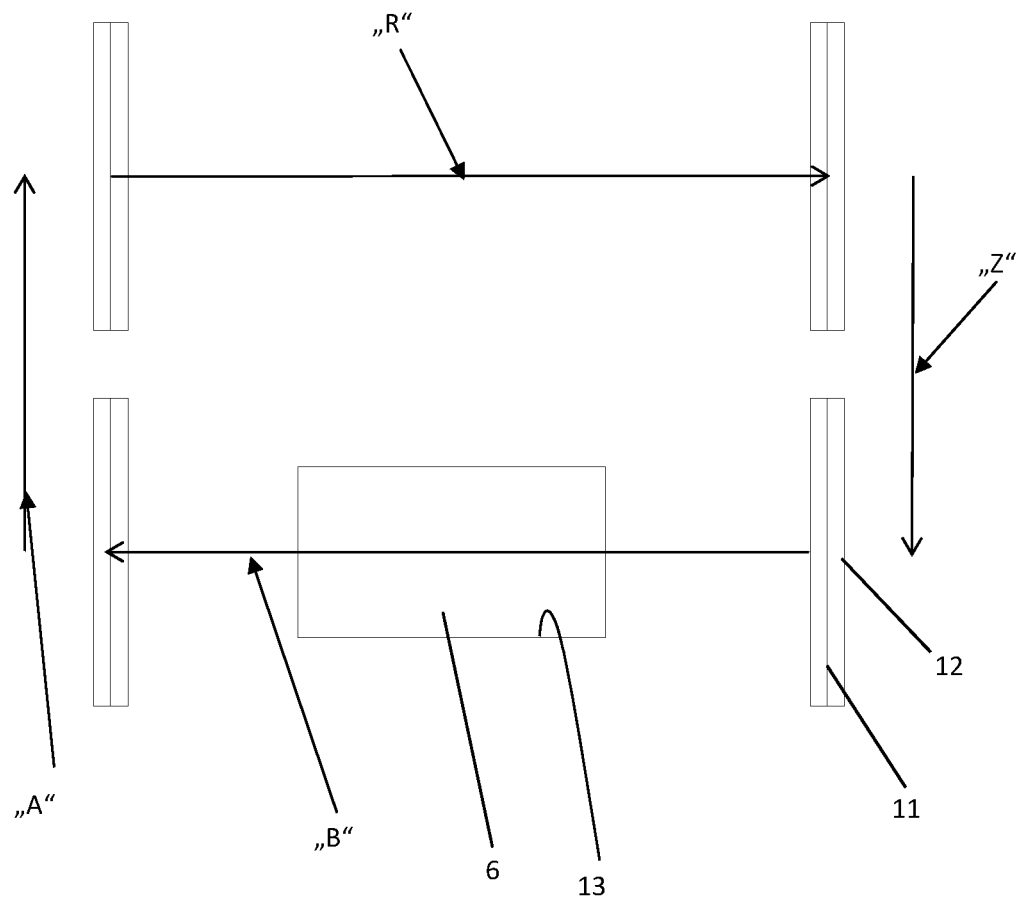
FIG. 4 shows a diagram similar to FIG. 3, in which the coating element movements are shown without the construction field openings.
Figure 5:
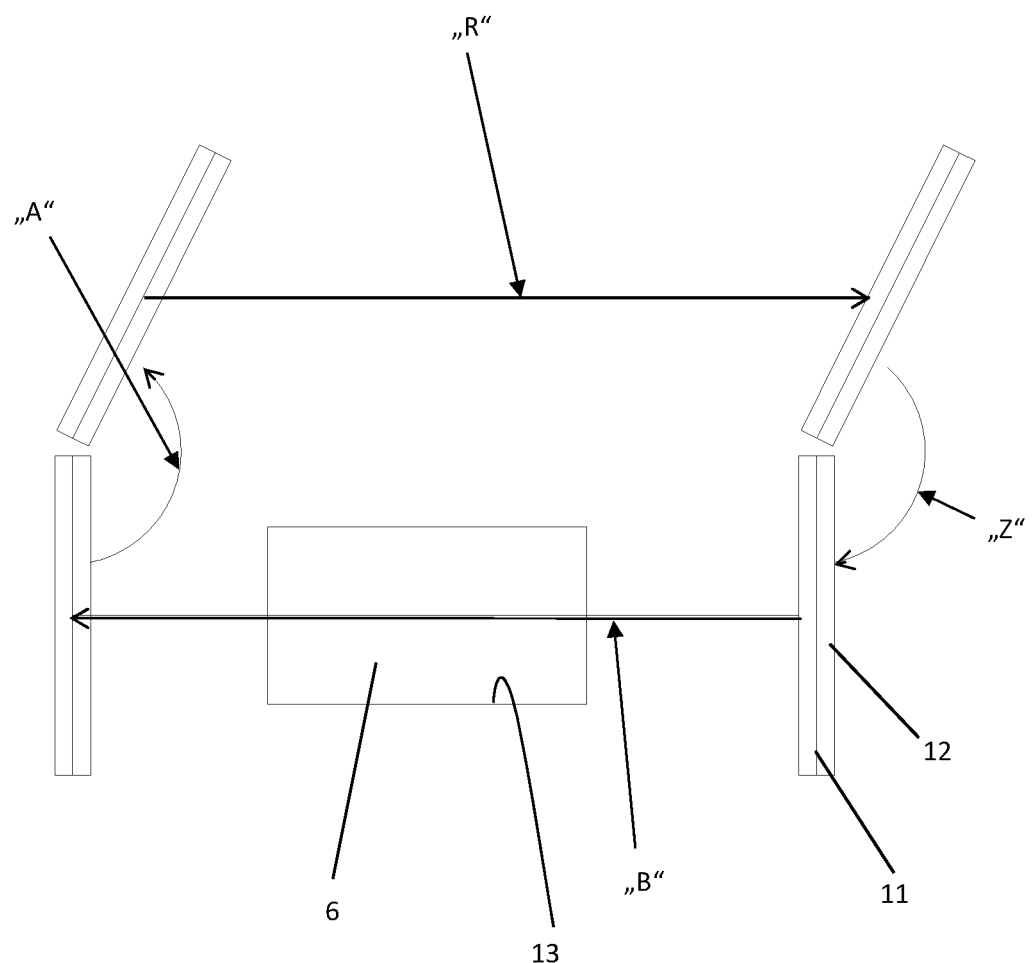
FIG. 5 shows a schematic diagram of a coating element assembly that can be swiveled up by a lateral swivel axis.

Similar to FIG. 4, FIG. 5 shows a top view in which the construction chamber 6 is just indicated. The application device 12 or at least the coating element 11 is swung up in the sense of a coating movement A and performs in the swung-up position the reverse movement R and can then be hinged down again to a horizontal position in the sense of a feed movement Z. Even with such an evasive movement arrangement, the scanner beam spatial area 30 remains unaffected.

Figure 6:
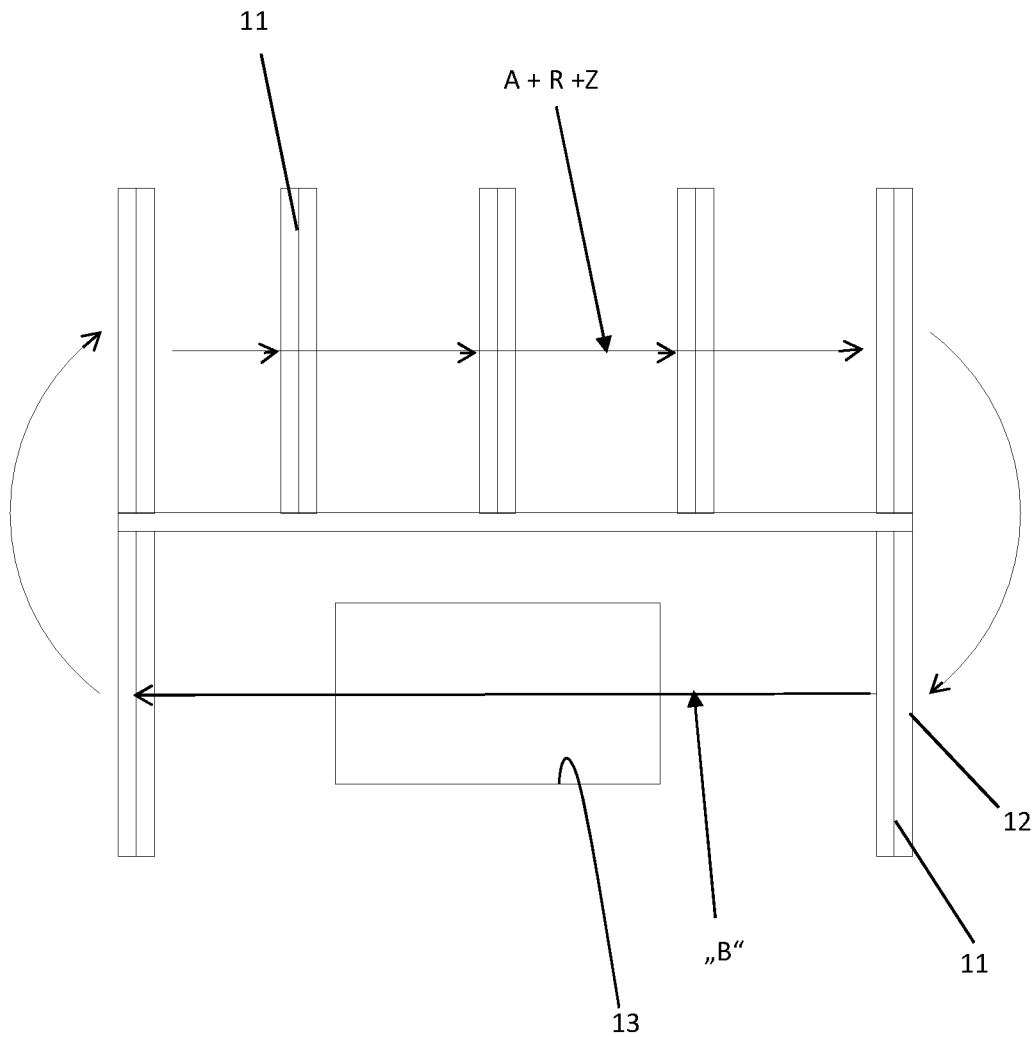
FIG. 6 shows a diagram of a coating element during layer application and during an evasive movement in which the coating element is swiveled horizontally outside the construction plane or with an additional fold-up component by 360°.

FIG. 6 shows another option to return the coating element 11 without disturbing the scanner beam spatial area 30. The coating element 11 is guided on a carriage of the application device 12, e.g., on a one-sided rail. After completion of the coating process B, the coating element 11 is returned to the starting position B1 in the sense of a combined evasive, reverse, and return movement A, R, Z, so to speak like a hand by 360° horizontally or with a superposed swing-up movement.

Figure 7:
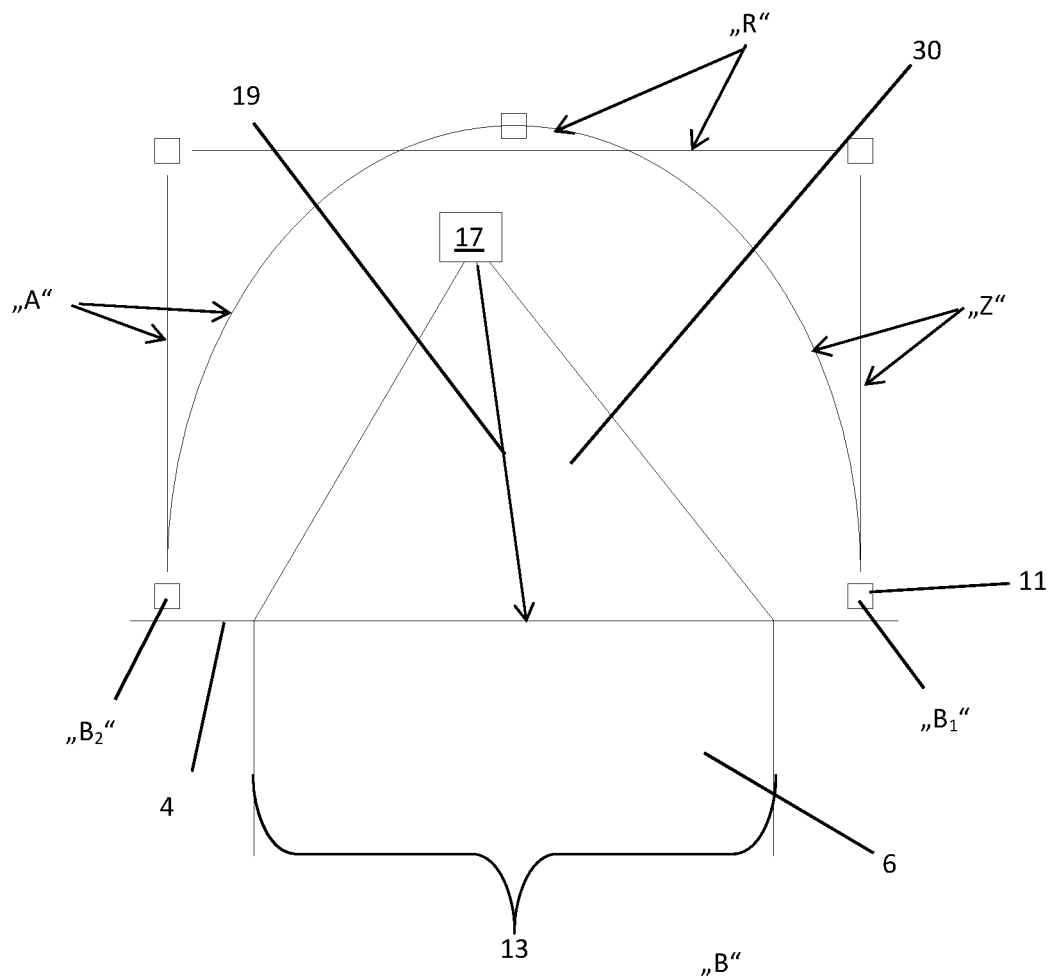
FIG. 7 shows a schematic diagram of a rectangular or curved guiding of a coating element across a scanner assembly.

FIG. 7 shows the coating element 11 from the side. During the coating process B, it is guided from the starting position B1 to the coating end position B2 and then rectangularly moved up and back to the starting position of the coating element 11 (A,R,Z).

The movements A, R, and Z are chosen such that they run above a scanner 17 and thus leave the entire scanner beam spatial area 30 unaffected.

FIG. 3 also shows a purely schematic cleaning device 50, in which the coating element 11 can be cleaned while being returned to the starting position B1, e.g., rinsed, blown off, or the like. Since this takes place remotely from the construction chamber 6, the construction process is not negatively affected by the cleaning process.

FIG. 3 also indicates a coating element changer 51, which can be structured like a magazine and comprises a multitude of identical or different coating elements 11. In the course of the return or evasive movement, a coating element carrier can be provided with a new or different coating element 11 in the range of the coating element changer 51.

It is also possible to couple a sensor element 52 for caustic measurement or the like to a coating element carrier instead of a new coating element 11, which can also be provided in the coating element changer 51.

LIST OF REFERENCE NUMBERS

1 Device
2 Housing
3 Process chamber
4 Process chamber floor
5 Metering device
6 Construction container
7 Carrying device
8 Overflow container
9 Construction material
10 Rail
11 Coating element
12 Application device
13 Opening of 6
15 Opening of 8
16 Laser
17 Scanner
18 Window
19 Laser beam
30 Scanner beam spatial area
50 Cleaning device
51 Coating element changer
52 Sensor element

The invention claimed is:

1. A device for producing three-dimensional objects by successively solidifying layers of a construction material, the device comprising:
  a housing comprising a process chamber, the process chamber having a construction container situated therein and the construction container comprising a carrying device,
  an irradiation device for irradiating layers of the construction material, the irradiation device comprising a scanner having a scanner beam spatial area disposed between the irradiation device and the construction container or a previously applied layer within the construction container,
  a metering device for delivering the construction material, and
  an application device for applying the layers of the construction material onto the carrying device within the construction container or onto a previously formed layer within the construction container,
  wherein the application device comprises a coating element movable during a coating process (B) from a starting position (B1) to an end position (B2) so as to distribute the construction material delivered by the metering device as a thin layer in an application area along a linear application movement, and
  wherein the coating element, after completion of the coating process (B) for a layer, makes an evasive return movement (A,R,Z) so as to return the coating element to the starting position (B1) without crossing the scanner beam spatial area such that a laser beam from the irradiation device has free access to a construction area defined by an opening of the construction container above the carrying device without hindrance by the coating element during the evasive return movement (A,R,Z).

2. The device of claim 1, wherein the spatial position of the coating element during the evasive return movement (A,R,Z) deviates from the spatial position of the coating element during the coating process (B).

3. The device of claim 1, wherein the evasive return movement (A,R,Z) comprises a linear shift movement of the coating element, the linear shift movement performed along a direction different from the direction of movement during the coating process (B).

4. The device of claim 3, wherein the direction of the evasive return movement (A) runs at right angles with the direction of movement during the coating process (B).

5. The device of claim 1, wherein the coating element is moved with an increased speed during the evasive return movement (A,R,Z) compared to a speed during the coating process (B).

6. The device of claim 1, wherein the evasive return movement (A,R,Z) comprises transferring the coating element to a position nonparallel to an applied powder layer.

7. The device of claim 1, wherein the coating element is supported pivotably by at least one axis on one side.

8. The device of claim 1, wherein the evasive return movement (A,R,Z) comprises a swing-up movement of the coating element.

9. The device of claim 1, wherein the evasive return movement (A,R,Z) comprises a swiveling movement during which the coating element is guided outside the construction area rotatingly around a swivel axis.

10. The device of claim 1, wherein the evasive return movement (A,R,Z) comprises lifting the coating element above the scanner and returning the coating element to the starting position (B1).

11. The device of claim 1, comprising a cleaning device (50), the coating element being exposed to the cleaning device (50) in the course of the evasive return movement (A,R,Z).

12. The device of claim 1, comprising a coating element changer (51), the coating element being exchangeable by the coating element changer (51) in the course of the evasive return movement (A,R,Z).

13. The device of claim 12, wherein the coating element changer comprises a changer magazine in which a plurality of identical or different coating elements and/or a sensor element are provided.

14. The device of claim 1, comprising at least one sensor element for measurement of a laser beam caustic, the at least one sensor being arranged on a holder of the coating element, the at least one sensor being guidable by the coating element across the construction area during the coating process (B) or instead of the coating process.

15. The device of claim 1, wherein the evasive return movement (A,R,Z) comprises the coating element being swung out of the construction area and returned to the starting position (B1).

16. A method for producing three-dimensional objects by successively solidifying layers of a construction material, the method comprising:
  causing an application device to perform a coating process (B) so as to apply a layer of a construction material onto a carrying device within a construction container or onto a previously formed layer within the construction container, wherein the application device comprises a coating element, and the coating process (B) comprises moving the coating element from a starting position (B1) to an end position (B2) so as to distribute the construction material delivered by the metering device as a thin layer in an application area along a linear application movement; and
  causing an irradiation device to irradiate the layer of construction material having been applied during the coating process (B), the irradiation device comprising a scanner having a scanner beam spatial area disposed between the irradiation device and the construction container or a previously applied layer within the construction container, and causing the application device to perform an evasive return movement (A,R,Z) so as to return the coating element to the starting position (B1) without crossing the scanner beam spatial area such that a laser beam from the irradiation device has free access to a construction area defined by an opening of the construction container above the carrying device without hindrance by the coating element during the evasive return movement (A,R,Z).

17. The method of claim 16, wherein the spatial position of the coating element during the evasive return movement (A,R,Z) deviates from the spatial position of the coating element during the coating process (B).

18. The method of claim 17, wherein the evasive return movement (A,R,Z) comprises:
   linearly shifting the coating element;
   swinging up the coating element;
   rotating the coating element around a swivel axis; or
   lifting the coating element.

19. The method of claim 16, wherein the direction of the evasive return movement (A) runs at right angles with the direction of movement during the coating process (B).

20. The method of claim 16, comprising exposing the coating element to a cleaning device (50) in the course of the evasive return movement (A,R,Z).

* * * * *